US005546078A

United States Patent [19]

Motohashi et al.

[11] Patent Number: 5,546,078

[45] Date of Patent: Aug. 13, 1996

[54] PAGING RECEIVER CAPABLE OF REPORTING THE TIME OF PAGING CONNECTION

[75] Inventors: Teruyuki Motohashi, Tokyo; Tomoshi Sone, Shizuoka, both of Japan

[73] Assignee: NEC Corporation, Japan

[21] Appl. No.: 333,744

[22] Filed: Nov. 3, 1994

Related U.S. Application Data

[63] Continuation of Ser. No. 964,462, Oct. 15, 1992, abandoned, which is a continuation of Ser. No. 675,511, Mar. 27, 1991, abandoned.

[30] Foreign Application Priority Data

Mar. 29, 1990 [JP] Japan ................................ 2-33063 U

[51] Int. Cl.[6] ...................................................... H04Q 7/14

[52] U.S. Cl. ..................................... 340/825.44; 455/38.4

[58] Field of Search ......................... 340/825.44, 825.48, 340/825.22, 311.1, 815.45; 368/223, 233, 241, 82, 83; 345/39, 46; 455/38.2, 38.4

[56] References Cited

U.S. PATENT DOCUMENTS

| | | | |
|---|---|---|---|
| 3,597,912 | 8/1971 | Akahano | 368/233 |
| 4,145,684 | 3/1979 | Stodolski | 340/825.48 |
| 4,160,240 | 7/1979 | Partipilo | 340/825.44 |
| 4,403,212 | 9/1983 | Masaki | 340/825.48 |
| 4,499,567 | 2/1985 | Armstrong | 340/825.44 |
| 4,702,615 | 10/1987 | Havel | 368/82 |
| 4,872,005 | 10/1989 | DeLuca et al. | 340/825.48 |
| 4,975,694 | 12/1990 | McLaughlin et al. | 340/825.44 |

FOREIGN PATENT DOCUMENTS 0086254 8/1983 European Pat. Off. .

*Primary Examiner*—Brian Zimmerman
*Assistant Examiner*—Edwin C. Holloway, III
*Attorney, Agent, or Firm*—Laff, Whitesel, Conte & Saret, Ltd.

[57] ABSTRACT

A paging receiver reporting paging when received a paging signal and storing and reporting the time when the paging signal is received. One or more LEDs selectively glow or intermittently flash in a particular color to inform the user of the time when the paging signal is received.

15 Claims, 13 Drawing Sheets

| TERMINAL / TIME (HOUR) | T1 | T2 | T3 | T4 | T5 |
|---|---|---|---|---|---|
| 0 | L | L | L | L | L |
| 1 | H | L | L | L | L |
| 2 | L | H | L | L | L |
| 3 | H | H | L | L | L |
| 4 | L | L | H | L | L |
| 5 | H | L | H | L | L |
| 6 | L | H | H | L | L |
| 7 | H | H | H | L | L |
| 8 | L | L | L | H | L |
| 9 | H | L | L | H | L |
| 10 | L | H | L | H | L |
| 11 | H | H | L | H | L |
| 0 | L | L | L | L | H |

| TERMINAL / TIME (HOUR) | T11 | T12 | T13 | T14 | T15 | T16 |
|---|---|---|---|---|---|---|
| 0 | L | H | H | H | H | H |
| 1 | L | L | H | H | H | H |
| 2 | H | L | H | H | H | H |
| 3 | H | L | L | H | H | H |
| 4 | H | H | L | H | H | H |
| 5 | H | H | L | L | H | H |
| 6 | H | H | H | L | H | H |
| 7 | H | H | H | L | L | H |
| 8 | H | H | H | H | L | H |
| 9 | H | H | H | H | L | L |
| 10 | H | H | H | H | H | L |
| 11 | L | H | H | H | H | L |

Fig. 16

| TIME OF PAGING | | LED | |
|---|---|---|---|
| | | COLOR | FLASH PATTERN (Fig. 17) |
| AM/PM | 0:00 ~ 0:59 | RED/GREEN | P1 |
| AM/PM | 1:00 ~ 1:59 | RED/GREEN | P2 |
| AM/PM | 2:00 ~ 2:59 | RED/GREEN | P3 |
| AM/PM | 3:00 ~ 3:59 | RED/GREEN | P4 |
| AM/PM | 4:00 ~ 4:59 | RED/GREEN | P5 |
| AM/PM | 5:00 ~ 5:59 | RED/GREEN | P6 |
| AM/PM | 6:00 ~ 6:59 | RED/GREEN | P7 |
| AM/PM | 7:00 ~ 7:59 | RED/GREEN | P8 |
| AM/PM | 8:00 ~ 8:59 | RED/GREEN | P9 |
| AM/PM | 9:00 ~ 9:59 | RED/GREEN | P10 |
| AM/PM | 10:00 ~ 10:59 | RED/GREEN | P11 |
| AM/PM | 11:00 ~ 11:59 | RED/GREEN | P12 |

Fig. 19

| TIME OF PAGING | COLOR (AM) | | COLOR (PM) | | FLASH PATTERN (FIG. 17) |
|---|---|---|---|---|---|
| | WINDOW 88 | WINDOW 90 | WINDOW 88 | WINDOW 90 | |
| AM/PM 0:00～0:59 | RED | RED | GREEN | RED | P1 |
| AM/PM 1:00～1:59 | RED | RED | GREEN | RED | P2 |
| AM/PM 2:00～2:59 | RED | RED | GREEN | RED | P3 |
| AM/PM 3:00～3:59 | RED | RED | GREEN | RED | P4 |
| AM/PM 4:00～4:59 | RED | RED | GREEN | RED | P5 |
| AM/PM 5:00～5:59 | RED | RED | GREEN | RED | P6 |
| AM/PM 6:00～6:59 | RED | GREEN | GREEN | GREEN | P7 |
| AM/PM 7:00～7:59 | RED | GREEN | GREEN | GREEN | P8 |
| AM/PM 8:00～8:59 | RED | GREEN | GREEN | GREEN | P9 |
| AM/PM 9:00～9:59 | RED | GREEN | GREEN | GREEN | P10 |
| AM/PM 10:00～10:59 | RED | GREEN | GREEN | GREEN | P11 |
| AM/PM 11:00～11:59 | RED | GREEN | GREEN | GREEN | P12 |

PAGING RECEIVER CAPABLE OF REPORTING THE TIME OF PAGING CONNECTION

This application is a continuation, of application Ser. No. 07/964,462, now abandoned, filed Oct. 15, 1992 which was a continuation of Ser. No. 07/675,511, filed Mar. 27, 1991, now abandoned.

BACKGROUND OF THE INVENTION

The present invention relates to a paging receiver for informing the user of paging when received a paging signal and, more particularly, to a paging receiver capable of memorizing and reporting the time when the paging signal is received.

A paging receiver extensively used today receives a radio signal via an antenna and a receiver circuit. A paging signal included in the received signal is compared with a paging number assigned to the receiver and stored in a memory. If they compare equal, a speaker produces an alert tone and/or a light emitting diode (LED) emits light to alert the user to the the paging. To stop the alert tone and/or the light, a reset switch provided on the receiver may be pressed. When a predetermined period of time elapses without the reset switch being pressed, the alert tone and/or the light is automatically turned off while the received data is written to the memory. Afterwards, as the user presses the reset switch, the received data is read out of the memory to turn on the alert tone and/or the light again in order to inform the user of the paging.

A conventional paging receiver of the type described lacks a function of informing the user of the time when the paging signal is received, i.e. time of paging. The user, therefore, cannot see the time of paging unless the user sees a watch, for example, when the speaker starts sounding and/or the LED starts glowing. This is also true with a paging signal received when the user put the receiver in, for example, an automobile and left the automobile, i.e., the user cannot see the time of paging at all although the user may press the reset switch later.

Some modern paging receivers have a CPU and a liquid crystal display (LCD). With this type of paging receiver, it is possible to cause the CPU to display the time of paging on the display. However, the CPU and display increase the overall weight, volume, surface area and current consumption of the receiver. Moreover, since the CPU feeds to the internal circuitry thereof signals produced by dividing the output signal of a crystal oscillator to necessary frequencies, the CPU itself constitutes a source of noise. The noise is apt to adversely affect the receiver circuit of the receiver to thereby lower the sensitivity. In addition, since the display is mainly made up of liquid crystal and glass, it is likely that the glass is broken when the receiver is accidentally let fall.

SUMMARY OF THE INVENTION

It is therefore an object of the present invention to provide a paging receiver capable of memorizing and reporting the time of paging together with received data without resorting to an LED.

It is another object of the present invention to provide a generally improved paging receiver with an LED as a display device capable of reporting the time of paging.

A paging receiver for reporting paging when received a paging signal of the present invention comprises a timepiece circuit for indicating the time of paging when the paging signal is received, a reporting device for reporting the time of paging, and a control responsive to the time of paging for causing the reporting device to report the time of paging.

BRIEF DESCRIPTION OF THE DRAWINGS

The above and other objects, features and advantages of the present invention will become more apparent from the following detailed description taken with the accompanying drawings in which:

FIG. 16 is a table representative of a specific method of causing the single LED to flash intermittently to indicate the time of paging;

FIG. 19 is a table representative of a specific method of causing the two LEDs to flash intermittently to indicate the time of paging.

DESCRIPTION OF THE PREFERRED EMBODIMENTS

To better understand the present invention, a brief reference will be made to prior art paging receivers, shown in FIGS. 1 and 2.

Figure 1:
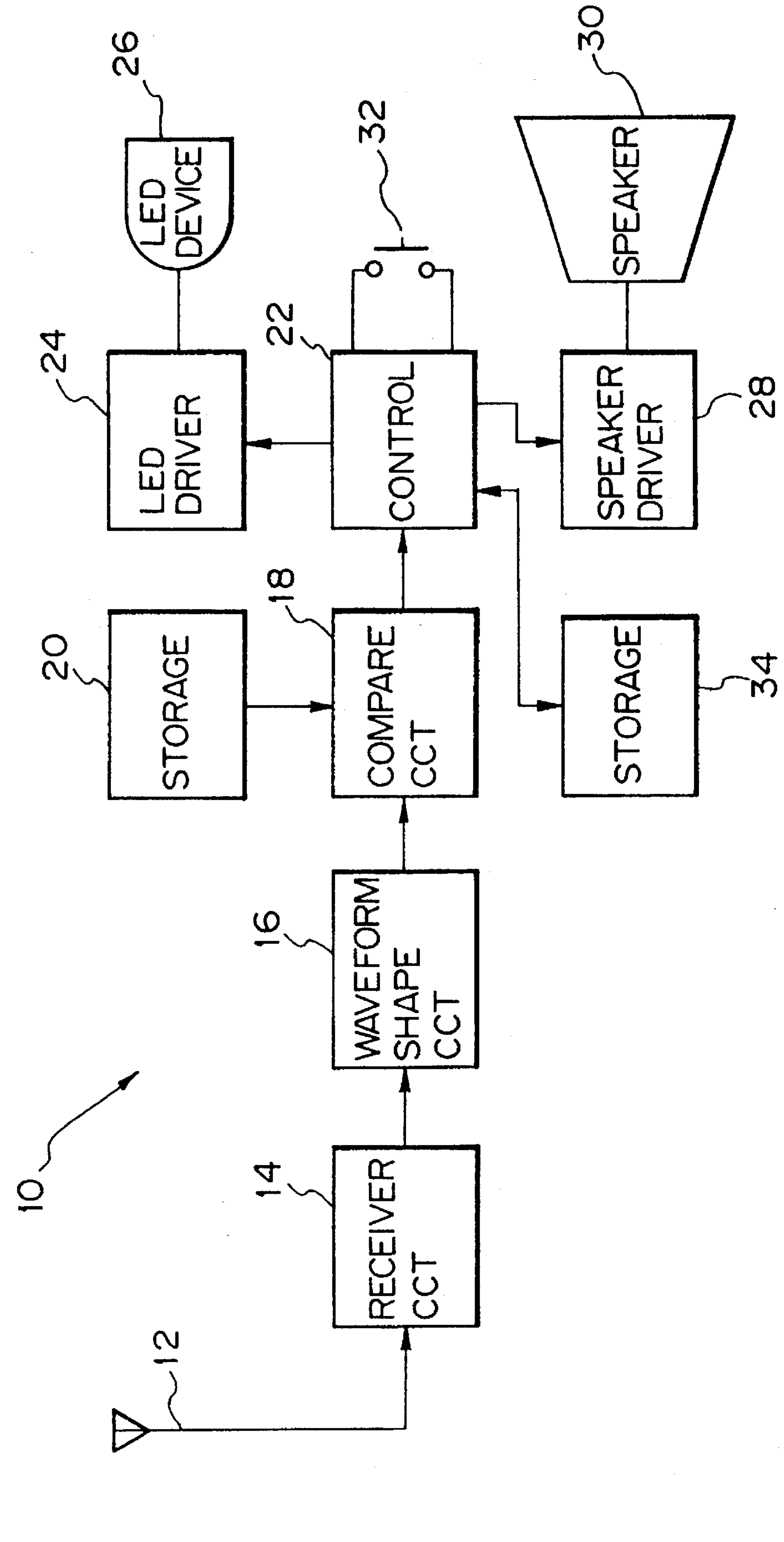
Fig. 1 PRIOR ART
FIG. 1 is a block diagram schematically showing a conventional paging receiver.

Referring to FIG. 1, a prior art paging receiver, generally 10, has an antenna 12 and a receiver circuit 14 for receiving a radio signal. A paging signal is separated from the received signal, processed by a waveform shaping circuit 16, and then applied to a comparing circuit 18. A paging number assigned to the paging receiver is stored in a storage 20 beforehand. The comparing circuit 18 compares the paging signal from the waveform shaping circuit 16 with the paging number stored in the storage 20. If the paging signal and the paging number compare equal, the comparing circuit 18 delivers a coincidence signal to a control 22. In response, the control 22 feeds an LED drive signal to an LED driver 24 which turns on an LED device 26. At the same time, the control 22 feeds a speaker drive signal to a speaker driver 28 which causes a tone alert device in the form of speaker 30 to produce an alert tone. When a reset switch 32 is pressed, the LED drive signal and speaker drive signal from the control 22 are interrupted to turn off the LED device 26 and speaker 30. When a predetermined period of time expires without the reset switch 32 being pressed, the LED device 26 and speaker 30 are automatically turned off while the received data is written to another storage 34. When the reset switch 32 is reset later, the control 22 again feeds the LED drive signal and speaker drive signal to the LED driver 24 and speaker driver 28, respectively, whereby the LED device 26 glows and the speaker 30 sounds.

Figure 2:
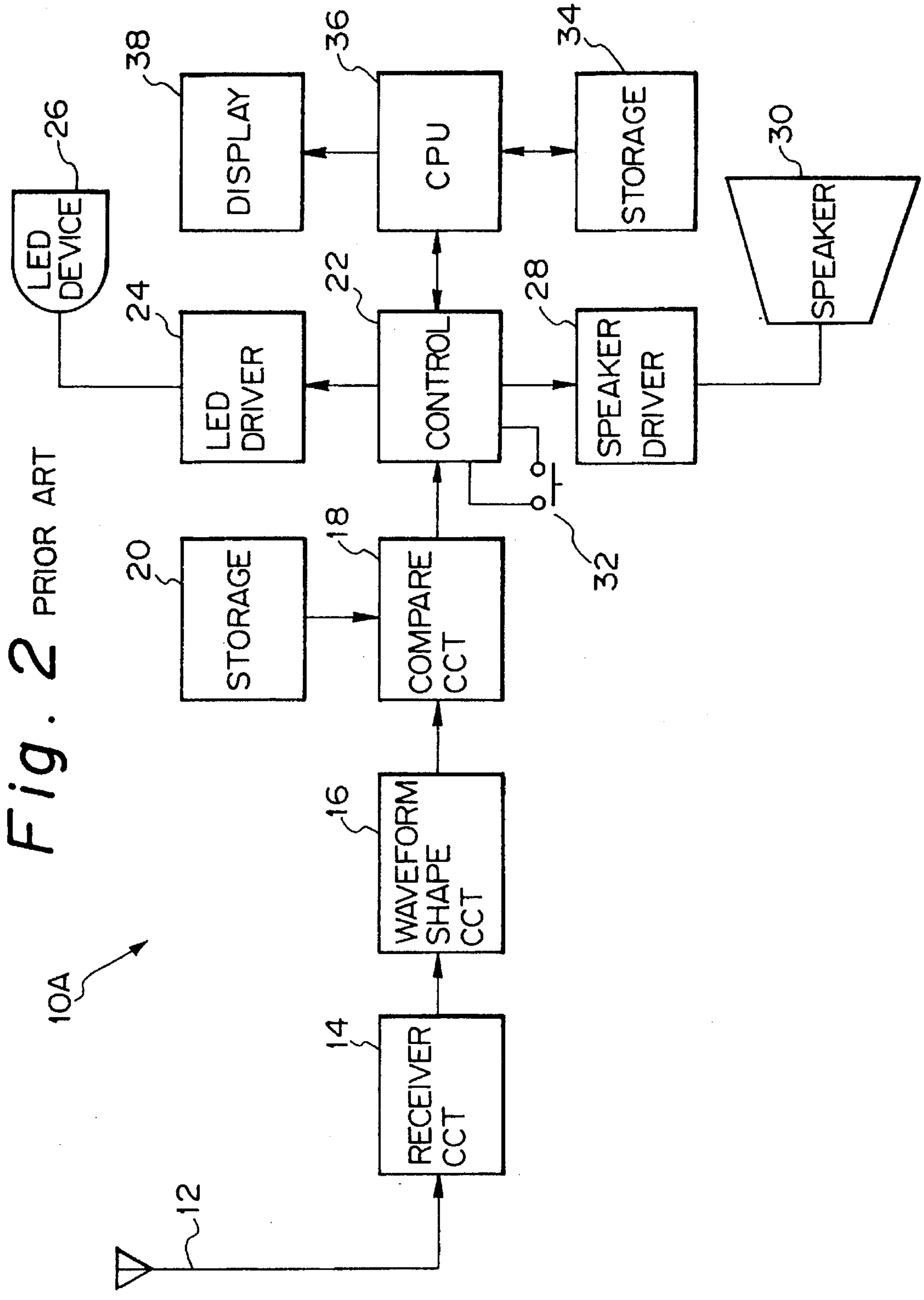
Fig. 2 PRIOR ART
FIG. 2 is a block diagram schematically showing another conventional paging receiver.

FIG. 2 shows another conventional paging receiver 10A which has a CPU 36 and a display 38 in addition to the components of the above-described paging receiver 10. In this case, the control 22 delivers a control signal to the CPU in response to the coincidence signal from the comparing circuit 18. Then, the CPU feeds a display signal to the display 38 to display received data and, at the same time, commands the CPU 36 to output the LED drive signal and speaker drive signal for thereby energizing the LED device 26 and speaker 28. When the reset switch 32 is pressed, the control 22 reports it to the CPU 36. In response, the CPU 36 interrupts the display signal to turn off the display 38 and commands the control 22 to interrupt the LED drive signal and speaker drive signal to thereby deenergize the LED device 26 and speaker 28. When a predetermined period of time expires without the reset switch 32 being pressed, the CPU 36 commands the control 22 to turn off the LED device 26 and speaker 28 while writing the received data in the storage 34. As the user presses the reset switch 32 later, the data is read out of the storage 34 and fed to the CPU 36. As a result, the CPU 36 causes the display 38 to display the data and, at the same time, drives the LED device 26 and speaker 28 via the control circuit 32.

The prior art paging receivers 10 and 10A both lack a function of reporting the time of paging, as stated earlier. This forces the user to look at a watch, for example, when the LED device 26 starts flowing and the speaker 28 starts sounding.

Figure 3:
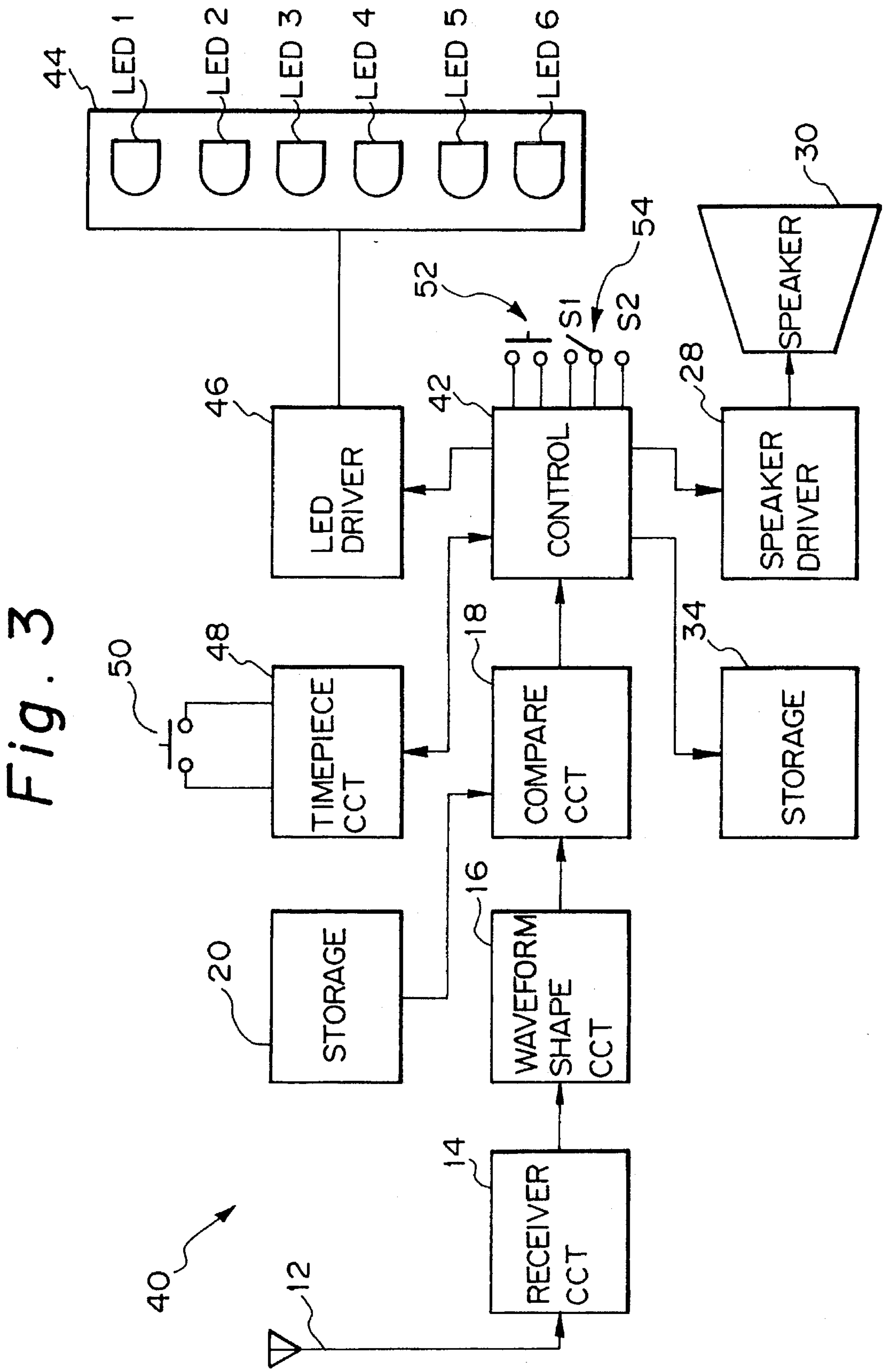
FIG. 3 is a block diagram schematically showing a paging receiver embodying the present invention.

Referring to FIG. 3, a paging receiver embodying the present invention will be described. As shown, the paging receiver, generally 40, has a control 42, a LED device 44 and a LED driver 46 which are different in function from the control 22, LED device 26 and LED driver 24 of the conventional paging receiver 10. In addition, the paging receiver 40 has a timepiece circuit 48, a timepiece start switch 50 for starting the timepiece circuit 48, a reset switch 52 operable to deenergize the LED device 44 and speaker 30 and to read received data out of a storage 34, and a time set switch 54 for setting the timepiece circuit 48 at a particular time such as 12.00 a.m. The rest of the construction is the same as the conventional paging receiver 10.

In the illustrative embodiment, the LED device 44 is implemented as a single package having LEDs LED1 to LED6 each of which can selectively glow in, for example, red or green. LED driver signals from the control 42 are fed to the LED driver 46 together with time information signals from the timepiece circuit 48 which is connected to the control 42. The time information signals and LED drive signals cause only particular ones of the LEDs to glow. The speaker 30 connected to the speaker driver 28 produces an alert tone. When the reset switch 52 is pressed, the particular LEDs stop glowing and the speaker 30 stops sounding. When the reset switch 52 is not pressed within a predetermined period of time, the control 42 deenergizes the LED device 44 and speaker 30 on the lapse of such a period of time. At the same time, the control 42 stores the LED turn-on signals, alert tone signals, and time information signals is the storage 34. When the reset switch 52 is pressed later, such data are read out of the storage 34 and transferred to the control 42. In response, the control 42 feeds a speaker drive signal to the speaker driver 28 and LED drive signals to the LED driver 46. Regarding the time set switch 54, when it is turned on, the timepiece circuit 48 will be stopped at the predetermined time such as 12.00 a.m. When the start switch 50 is turned on, the timepiece 48 starts counting time.

Figure 4:
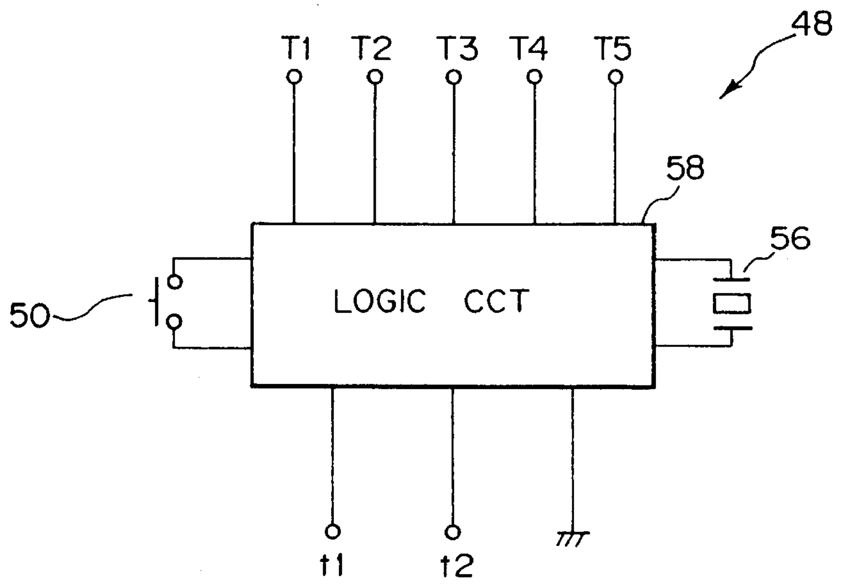
FIG. 4 is a block diagram schematically showing a specific construction of a timepiece circuit included in the embodiment.

As shown in FIG. 4, the timepiece circuit 48 has a crystal oscillator 56 which outputs a reference clock, and a logic circuit 58. The logic circuit 58 has an input terminal t1 for detecting that the time reset switch 54 has been turned on, a power source input terminal t2, and five output terminals T1 to T5 on which time information signals representing time information in five bits appear.

Figure 5:
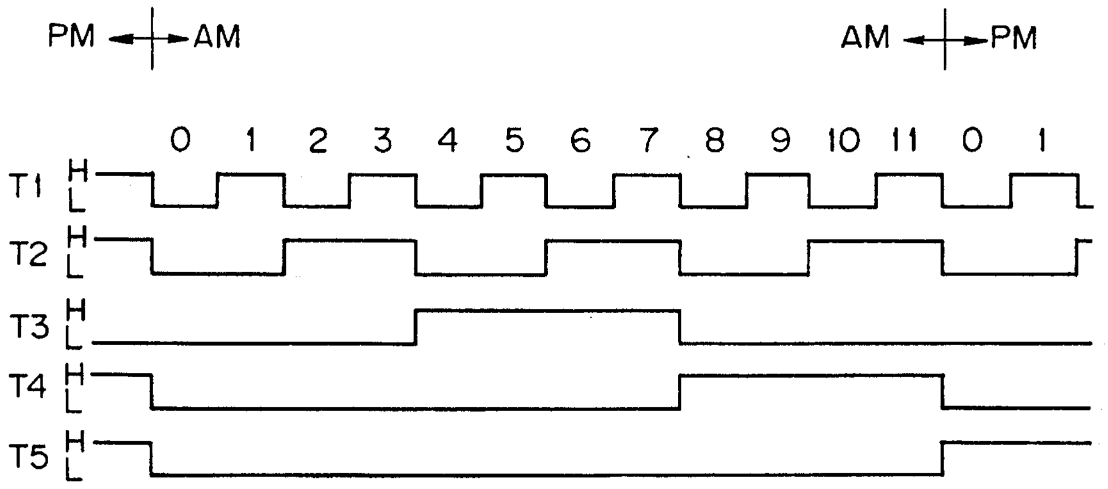
FIG. 5 plots the waveforms of the information signals appearing on the output terminals of the timepiece circuit.
Figures 6, 7:
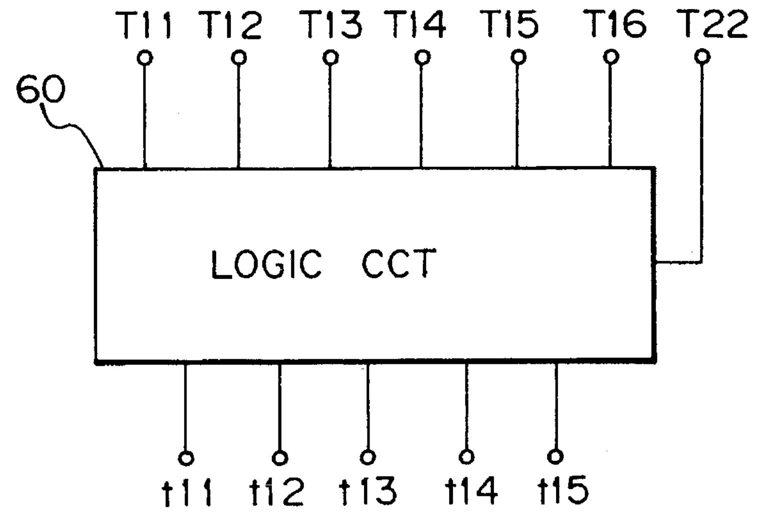
FIG. 6 shows a logic table representative of signal levels of the output terminals corresponding to various times of paging.
FIG. 7 is a block diagram schematically showing a specific construction of a converting circuit forming part of an LED driver also included in the embodiment.

FIG. 5 is a timing chart representative of the time information signals appearing on the output terminals T1 to T5, FIG. 4. FIG. 6 shows a logic table showing various combinations of such signals. As shown, the high and low levels or "H" and "L" of the signals on the output terminals T1 to T4 are combined to represent 1.00 to 12.00 while the signal level on the terminal T5 distinguishes a.m. and p.m. from each other.

FIG. 7 shows a converting circuit 60 forming part of the LED driver 46. The converting circuit 60 selects particular ones of LEDs LED1 to LED6 of the LED device 44 in response to the time information signals fed from the control 42. The converting circuit 60 has terminals t11 to t15 for receiving the time information signals from the control 42, and output terminals T11 to T16 for selecting necessary ones of the LESs LED1 to LED6 of the LED device 44.

Figures 8, 9:
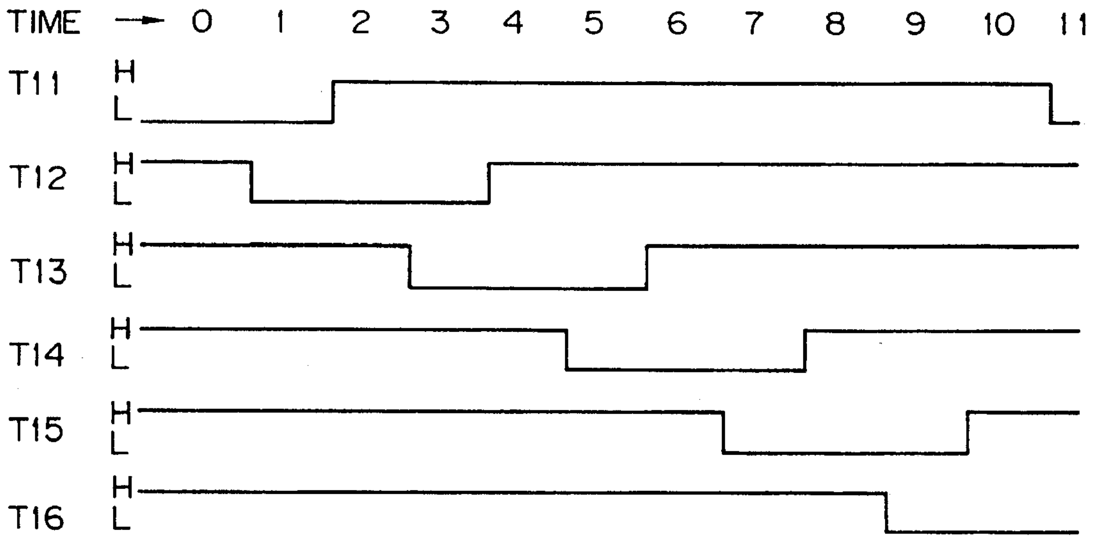
FIG. 8 is a timing chart showing LED selection signals appearing on the output terminals of the converting circuit.
FIG. 9 shows a logic table representative of signal levels on the output terminals of the converting circuit corresponding to various times of paging.

FIG. 8 is a timing chart showing signals appearing on the terminals T11 to T16 of converting circuit 60, while FIG. 9 is a logic table associated with the timing chart. As shown in FIG. 8, when a particular signal is in a low level or "L", one LED associated therewith is turned on. For example, the signal on the terminal T11 is in a low level at 12.00, the terminals T11 and T12 are in a low level at 1.00, and the terminals T12 is in a low level at 2.00.

Figure 10:
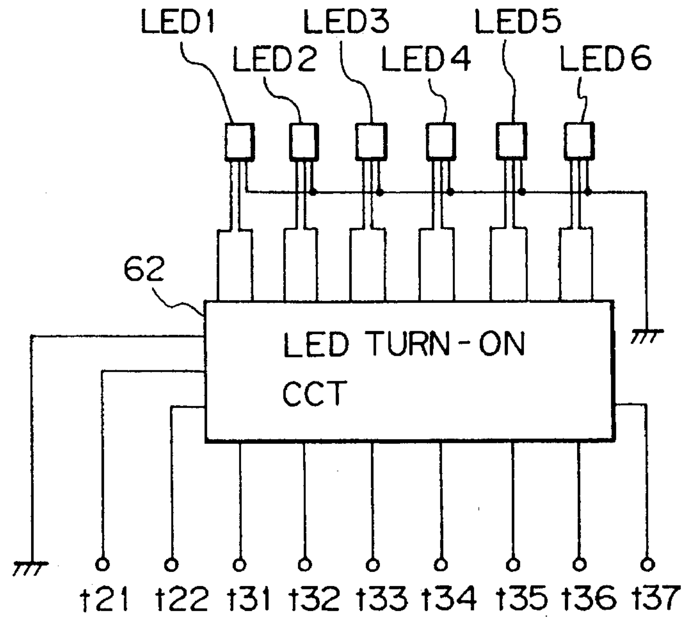
FIG. 10 is a schematic block diagram showing a specific construction of an LED turn-on circuit forming another part of the LED driver of FIG. 3.

FIG. 10 shows an LED turn-on circuit 62 forming another part of the LED driver 46. As shown, the LED turn-on circuit 62 has a power source input terminal t21, a time information signal input terminal t22, and input terminals t31 to t36 for selectively turning on the LEDs LED1 to LED6. The terminals t31 to t36 are respectively connected to the output terminals T11 to T16 shown in FIG. 7.

Figure 11:
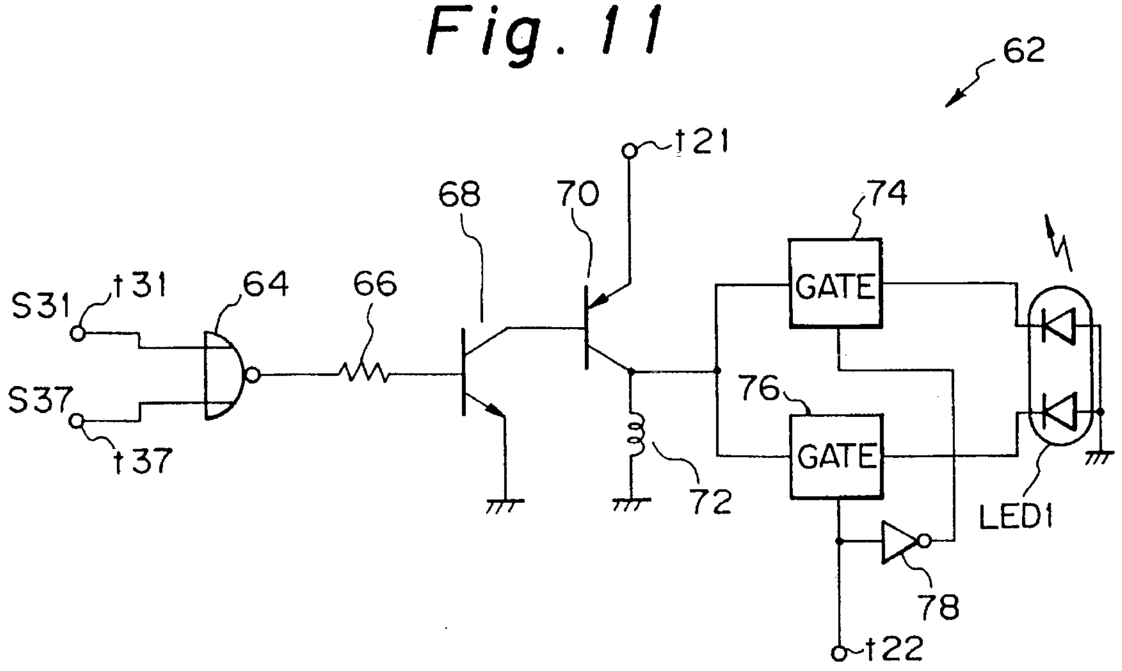
FIG. 11 is a circuit diagram showing the LED turn-on circuit more specifically.
Figure 12:
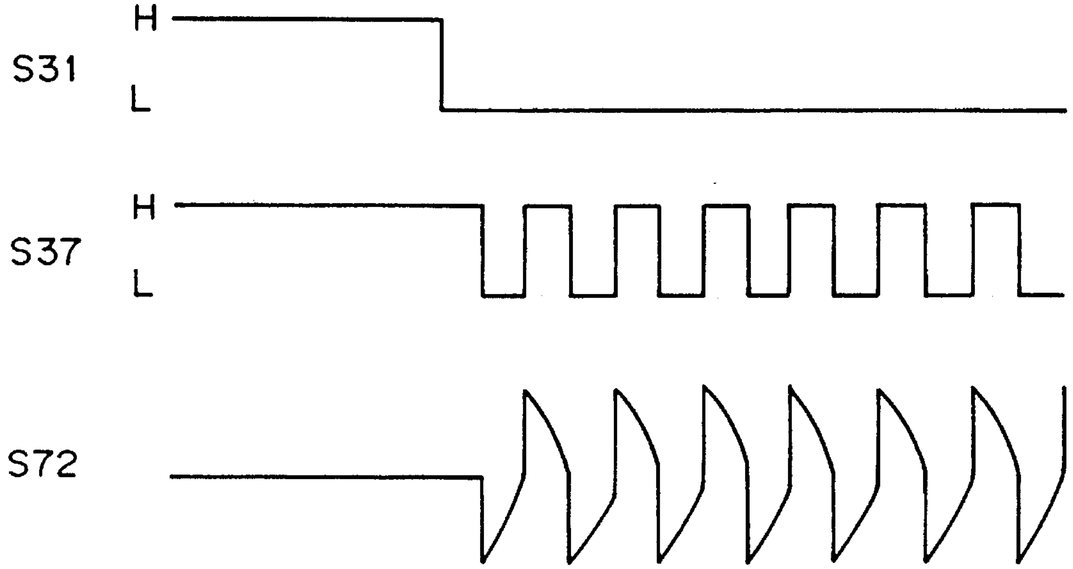
FIG. 12 is a timing chart showing signals fed to the LED turn-on circuit of FIG. 11.

The LED turn-on circuit 62 is shown in FIG. 11 more specifically. FIG. 12 is a timing chart showing signals fed to this circuit 62. As shown, the circuit 62 has a NOR gate 64, a base resistor 66, transistors 68 and 70, a booster coil 72, gates 74 and 76, and an inverter 78. The LED1 is capable of glowing in two different colors, e.g. red and green. When a signal S31 fed to the input terminal t31 changes from "H" to "L" as shown in FIG. 12, a signal S37 fed to the input terminal t37 is applied to the NOR gate 64 as also shown in FIG. 12. The booster coil 72 boosts the signal S37, as represented by a signal S72 in FIG. 12. When the gate 74 is enabled by the time information signal fed to the input terminal t22, the LED1 glows in red; when the other gate 76 is enabled, the LED1 glows in green.

Figure 13:
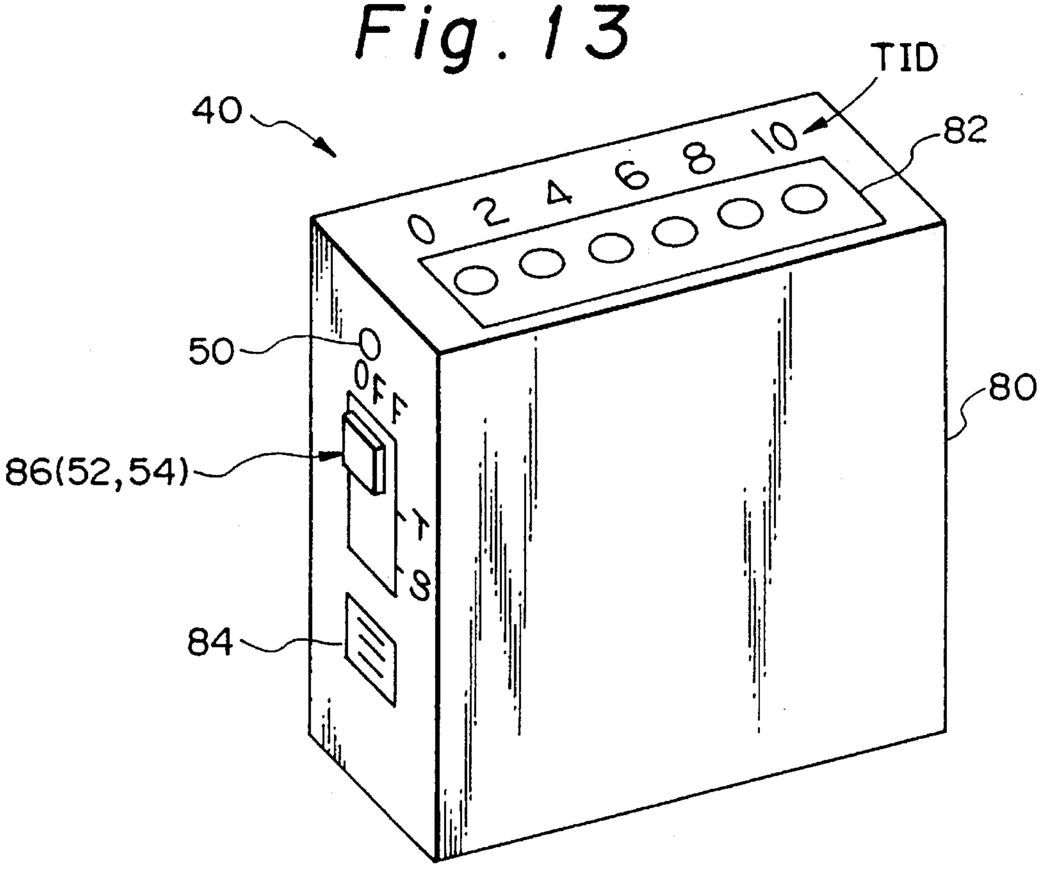
FIG. 13 is a perspective view of the embodiment.

Referring to FIG. 13, the paging receiver 40 is shown in a perspective view. As shown, the paging receiver 40 has a casing 80, a window 82 where the LEDs LED1 to LED6 are arranged in an array, a speaker window 84, a switch bifunctioning as the reset switch 52 and the time set switch 54. A numerical time information display TID is provided adjacent the display window. When the switch 86 is brought to a position labeled T, the paging receiver 49 is powered and ready to receive a paging signal. When the receiver 49 receives a paging signal, an alert tone is produced through the speaker window 84 and particular ones of the LED1 to LED6 are turned on. The user, therefore, can see the time of paging by watching the glowing LED or LEDs and the color thereof. When the switch 86 is pressed, i.e., when the reset switch 54 is turned on, the LED or LEDs are turned off and the alert tone is interrupted. Assume that the switch 86 is in a position labeled S, i.e., the switch 54 has the movable contact thereof connected to a stationary contact $S_2$, as shown in FIG. 3. Then, the timepiece circuit 48 will stop operating at a predetermined time such as 12.00 a.m. When the timepiece start switch 50 is turned on, the timepiece circuit 48 starts operating and allows the time to be corrected.

Figure 14A:
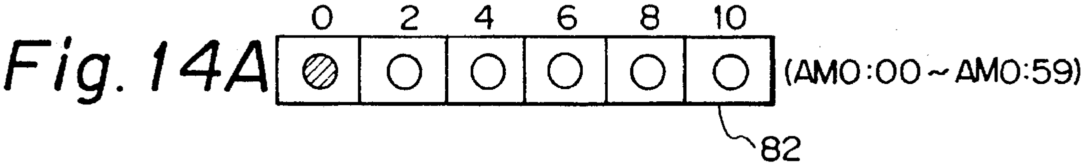
FIGS. 14A to 14D show specific patterns in which the LEDs may glow to indicate the time of paging.
Figure 14B:
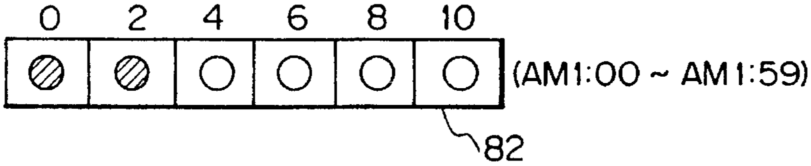
Figure 14C:
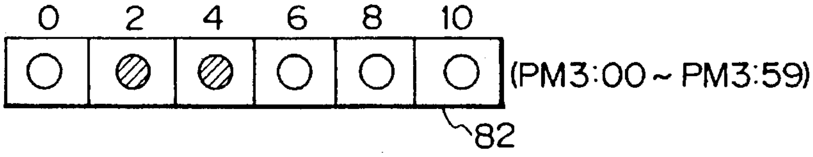
Figure 14D:
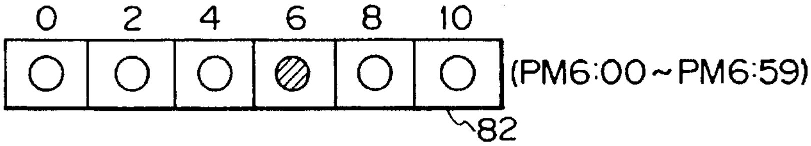

As shown in FIGS. 14A to 14D, the LEDs LED1 to LED6 visible through the window 82 are selectively turned on in a particular color to indicate the time of paging. For example, assuming that the time of paging lies in the range of 12.00 a.m. to 12.59 a.m., the LED adjacent to the numberal 0 glows in red, as shown in FIG. 14A. When the time of paging lies in the range of 1.00 a.m. to 1.59 a.m., the LEDs associated with the numerals 0 and 2 glow in red, as shown in FIG. 14B. When the time of paging lies in the range of 3.00 p.m. to 3.59 p.m., the LEDs associated with the numerals 2 and 4 glow in green, as shown in FIG. 14C. Further, when the time of paging lies in the range of 6.00 p.m. to 6.59 p.m., the LED associated with the numeral 6 glows in green, as shown in FIG. 14D. When the reset switch 52 is pressed to call the data having been stored in the storage 34, a particular LED or LEDs matching the time when the data has been received glow. The turn-on of the LED or LEDs is accompanied by an alert tone through the window 84 at all times.

Figure 15:
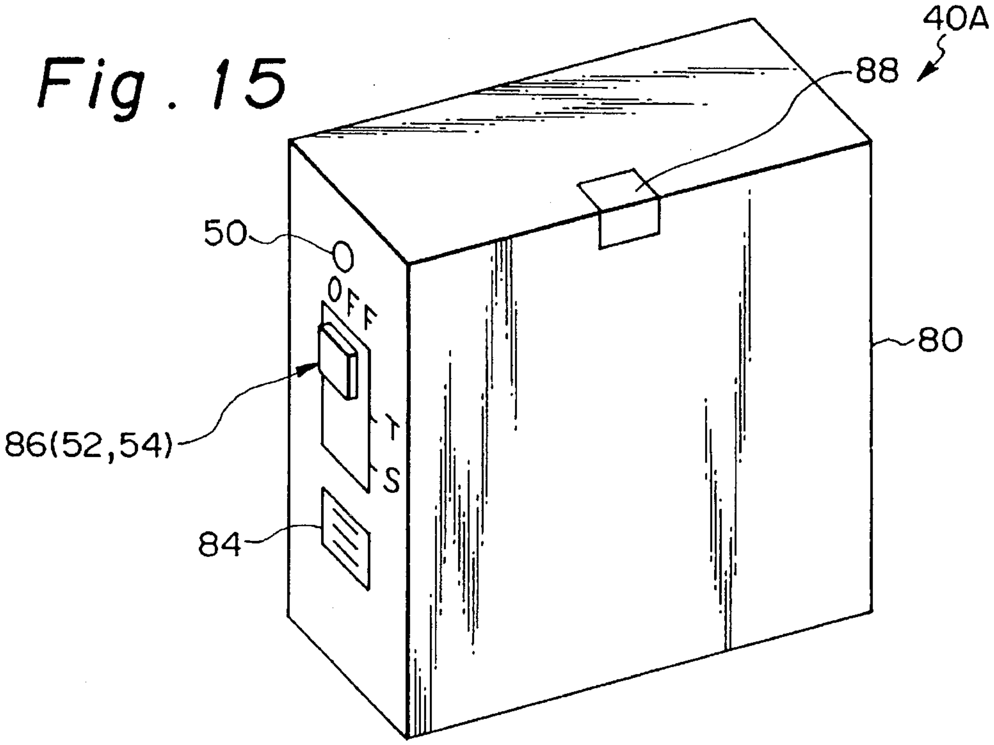
FIG. 15 is a perspective view of an alternative embodiment of the present invention having a single LED.
Figure 17:
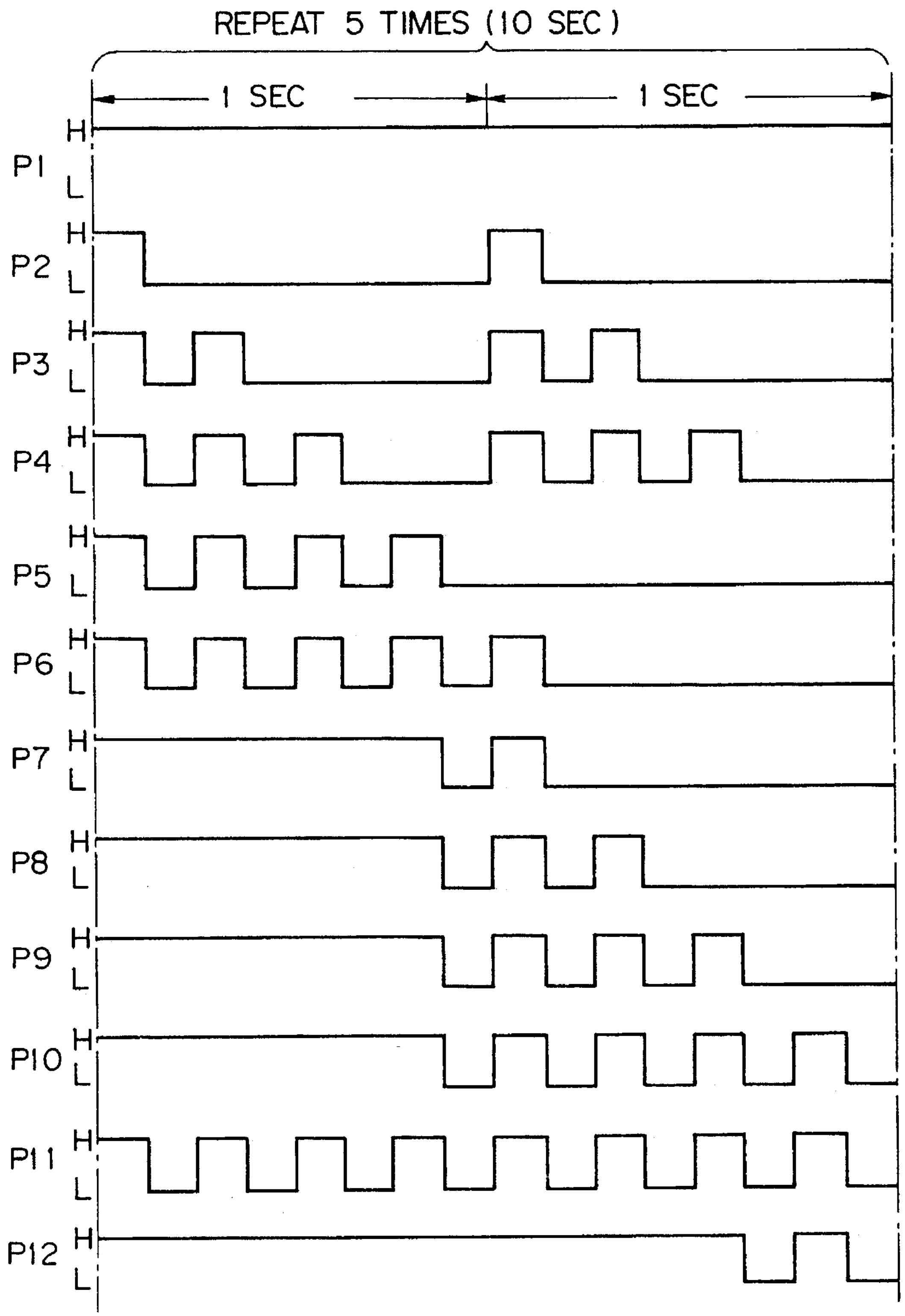
FIG. 17 is timing chart showing drive pulses each of which causes the single LED to flash in a particular manner.

Referring to FIG. 15, an alternative embodiment of the present invention is shown in a perspective view. As shown, the paging receiver, generally 40A, has a single LED capable of selectively glowing in two different colors such as red and green in place of the LED device 44 of the previous embodiment. The light issuing from the LED irradiates the window 88 of the casing 80. More specifically, the window 88 glows when a paging signal is received. Regarding the color, the LED may glow in red to indicate an urgent call or in green to indicate an ordinary call by way of example. To display the time of paging, the LED may glow in red if a paging signal is received in the morning or in green if it is received in the afternoon. Alternatively, the LED may be caused to flicker to indicate the time of paging. Specifically, the LED may flash six consecutive times in red within a predetermined period of time (e.g. 10 seconds) to indicate 6.00 a.m. or ten consecutive times in green to indicate 10.00 p.m. Further, the flashing time itself may be changed to distinguish the morning and the afternoon or to indicate the time of paging. Such an alternative scheme is shown in FIGS. 16 and 17 specifically. As shown in FIG. 16, the LED flickers in red to indicate the morning or in green to indicate the afternoon. Regarding the time, the LED is driven by particular one of different pulse waveforms, or flashing patterns, P1 to P12 shown in FIG. 17.

If desired, the flashing patterns P1 to P12 shown in FIG. 17 may be used to cause different alert tones to be selectively produced through the speaker window 84 intermittently. This is also successful in distinguishing the morning and the afternoon and in indicating the time itself.

Figure 18:
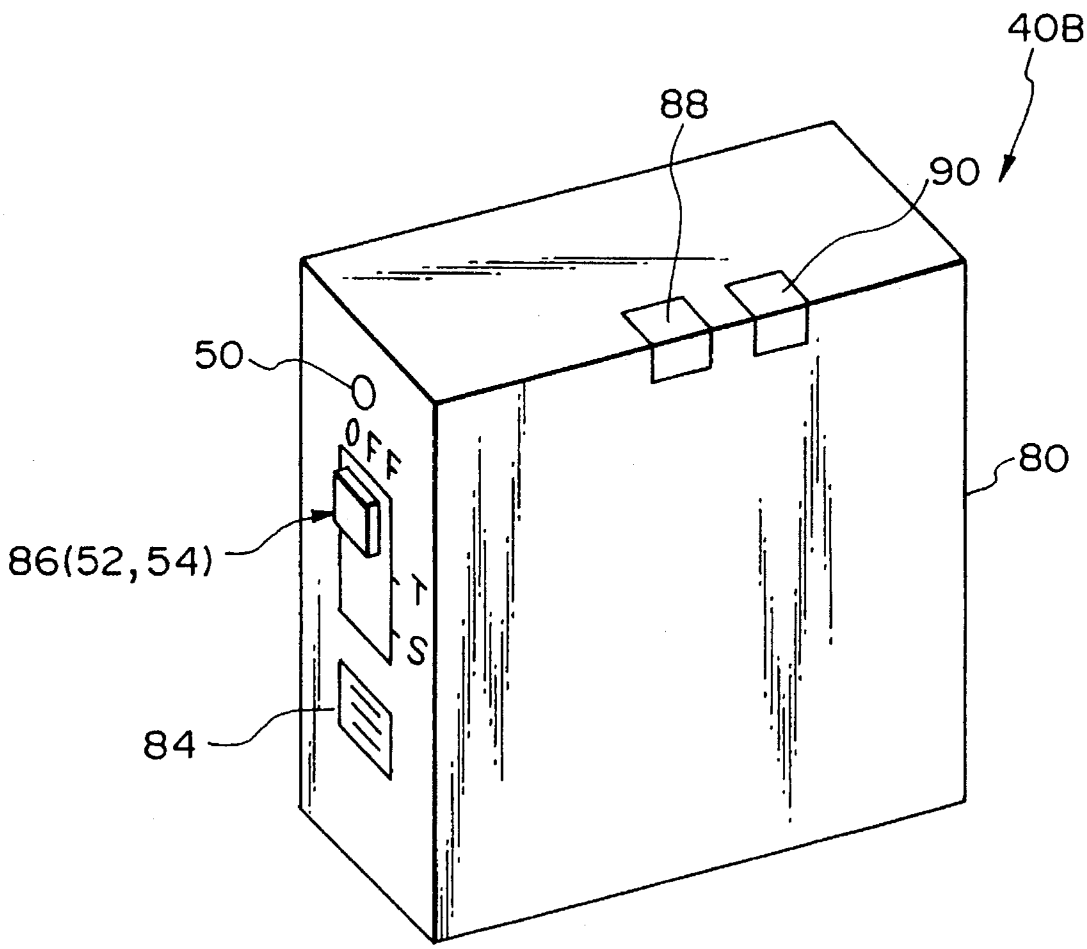
FIG. 18 is a perspective view showing another alternative embodiment of the present invention having two LEDs.

FIG. 18 shows another alternative embodiment of the present invention. As shown, the paging receiver 40B has another LED in addition to the LED of the paging receiver 40A, FIG. 15. When the LED is energized, it irradiates a window 90 also formed through the casing 80. The time of paging is indicated by the combination of the ON/OFF states and colors of the two LEDs. Specifically, an arrangement may be made such that the window 88 glows in red to indicate the time zone of 12.00 a.m. to 5.59 a.m., the window 88 glows in green to indicate the time zone of 6.00 a.m. to 11.59 a.m., the window 90 glows in red to indicate the time zone of 12.00 p.m. to 5.59 p.m., and the window 90 glows in green to indicate the time zone of 6.00 p.m. to 11.59 p.m. Alternatively, an arrangement may be made such that the windows 88 and 90 both glow in red to indicate the time zone 12.00 a.m. to 5.59 a.m., the windows 88 and 90 glow respectively in red and in green to indicate the time zone of 6.00 a.m. to 11.59 a.m., the windows 88 and 90 glow respectively in green and in red to indicate 12.00 p.m. to 5.59 p.m., and the windows 88 and 90 both glow in green to indicate the time zone of 6.00 p.m. to 11.59 p.m. Further, the two LEDs may each flash intermittently to report the time of paging, as shown in FIG. 19 specifically. As shown in FIG. 19, the morning and the afternoon are distinguished by the combination of colors, i.e., red and green in which the LEDs flash, while the time is indicated by particular one of the flashing patterns shown in FIG. 19.

Again, the flashing patterns shown in FIG. 19 may be used to cause different tones to be selectively produced through the speaker window 84 intermittently to indicate the time of paging.

In summary, the present invention provides a paging receiver which alerts the user to paging surely and rapidly by indicating the time of paging in terms of the continuous or discontinuous glowing of a LED or LEDs and the color in which they glow. This is achievable without increasing the weight, volume, surface area or current consumption of the paging receiver. Since the paging receiver does not have any fragile portion such as a display, it will not break easily even when accidentally let fall.

Various modifications will become possible for those skilled in the art after receiving the teachings of the present disclosure without departing from the scope thereof.

What is claimed is:

1. A selective call receiver having alerting means for reporting paging when a paging signal is received, said receiver comprising:

timepiece means (48) for outputting time information;

storing means (34) for storing predetermined time information in response to said timepiece means;

control means (42) for storing said time information supplied by said timepiece means in said storing means in response to detection of a paging call;

switch means (52) connected to said control means for resetting and starting a sequence in response to an access thereto, said sequence relating to a display of said time information stored in said storing means;

drive means (46) connected to said control means for converting said information stored in said storing means and outputting the converted information;

display means (44) connected to said control means, said display means including a plurality of substantially identical individual one spot light emitting display elements for giving a data readout in uniform on/off light signals, said display elements operating in a coded combination responsive to a signal from said drive means for selectively causing said plurality of display elements to provide a coded visible display; and time information display means (TID) adjoining said display means for providing said coded display relating to said time information;

said drive means comprising first selecting means (60) for converting said time information received from said control means to a signal for selecting any coded combination of said plurality of one spot light emitting display elements, and comprising alert signal drive means (64) for feeding a timing signal representative of paging to the selected light emitting display element.

2. A receiver as claimed in claim 1, wherein said plurality of display elements comprise a plurality of LED means for giving selected displays in various colors, said drive means further comprising second selecting means for converting said time information from said control means to a signal for selecting any of said plurality of display LED means for selecting said displays in various colors.

3. A selective call paging receiver as claimed in claim 1, wherein said display means further comprises said sounding means for producing sound indicative of said time of paging under the control of said control means.

4. A selective call paging receiver as claimed in claim 1, wherein said display means one spot light emitting elements for displaying said paging comprises two LEDs (88, 90) and sounding means (84) for producing sound, said control means (42) controlling said two LEDs and said sounding means such that said sounding means sounds intermittently in a predetermined pattern and each of said two LEDs glows in a predetermined color to indicate said time of paging.

5. A selective call paging receiver as claimed in claim 1 wherein said storage means comprises means for storing paging data including said time of paging.

6. A paging receiver as claimed in claim 1, further comprising stopping means for causing said reporting means to stop reporting said time of paging.

7. A selective call paging receiver as claimed in claim 6, wherein said stopping means and a time setting means are constructed integrally with each other.

8. A paging receiver as claimed in claim 6, wherein the predetermined time information stored in said storing means is paging data including said time of paging.

9. A selective call paging receiver as claimed in claim 8, wherein said stopping means further reads out said paging data to said storage means.

10. A selective call paging receiver comprising means for reporting said paging comprising a single LED (88), and alerting means (84) for reporting paging when a paging signal is received, said receiver comprising:

timepiece means (48) for outputting time information;

storing means (34) for storing predetermined time information responsive to said timepiece means;

control means (42) for storing said time information supplied by said timepiece means in said storing means in response to detection of a paging call;

switch means (52) connected to said control means for resetting and starting a timing sequence, said sequence relating to a display of said time information stored in said storing means;

drive means (46, 28) connected to said control means for converting said information stored in said storing means and outputting the converted information;

display means connected to said control means, said display means including said single LED (88) forming a light emitting display element, and operating responsive to a signal from said drive means (46) for selectively causing said single LED to give a selected one of a plurality of displays, said control means (42) controlling said single LED so that said single LED flashes intermittently in a predetermined flashing pattern and in a predetermined color to provide a visible display; and said drive means (46) comprising first selecting means for converting said time information from said control means into a signal for selecting a display, and feeding a timing signal representative of paging to the light emitting display element.

11. A selective call paging receiver as claimed in claim 10, further comprising stopping means for causing said reporting means to stop reporting said time of paging.

12. A selective call paging receiver as claimed in claim 11, wherein said stopping means and a time setting means are constructed integrally with each other.

13. A selective call paging receiver as claimed in claim 11, wherein said stopping means further reads out said paging data to said storage means.

14. A selective call paging receiver having an alerting means for reporting paging when a paging signal is received, said receiver comprising:

alerting means for displaying said paging comprising a plurality of LED's (82) and sounding means (84) for producing an LED's alert tone, timepiece means (48) for outputting time information;

storing means (34) responsive to said timepiece means for storing predetermined time information;

control means (42) for storing said time information supplied by said timepiece means in said storing means in response to detection of a paging call;

switch means (52) connected to said control means for resetting and starting a timing sequence in response to an access thereto, said sequence relating to a display of said time information stored in said storing means;

drive means (28, 46) connected to said control means for converting said information stored in said storing means and outputting the converted information;

display means connected to said control means, said display means including said LED (88) and said sounding means (84) for operating responsive to a signal from said drive means for selectively causing said display means to provide at least one of visible and audible displays;

time information display means (TID) adjoining said display means for providing a display relating to said time information;

said drive means (46) comprising first selecting means for converting said time information from said control means to a signal for selecting any of said plurality of LED's, and comprising alert signal drive means for feeding a timing signal representative of paging to the selected light emitting display element; and said control means (42) controlling said LED's and said sounding means, said sounding means sounding in a predetermined intermittent pattern and said LED's glowing in a predetermined color in response to said time of paging thereby giving a plurality of paging signals.

15. A selective call paging receiver as claimed in claim 14, further comprising stopping means for causing said reporting means to stop reporting said time.

* * * * *